Figure 1:
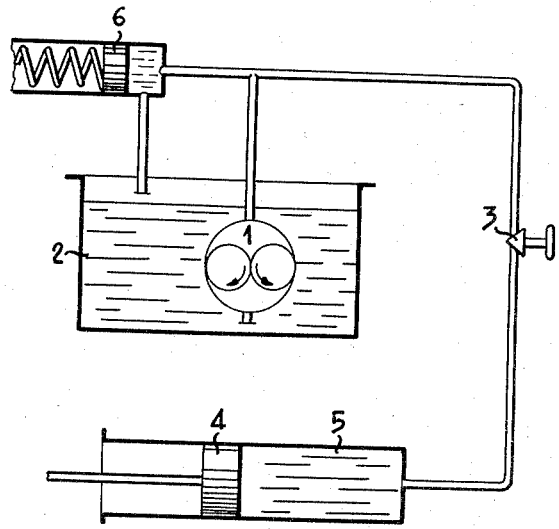

March 23, 1954

C. DEVAUD 2,672,730

VISCOSITY CHANGE COMPENSATION FOR HYDRAULIC FEED SYSTEMS

Filed May 28, 1951

3 Sheets-Sheet 1

INVENTOR
CHARLES DEVAUD
Fritz G. Rockwell
AGENT

March 23, 1954

C. DEVAUD 2,672,730

VISCOSITY CHANGE COMPENSATION FOR HYDRAULIC FEED SYSTEMS

Filed May 28, 1951

3 Sheets-Sheet 2

INVENTOR
CHARLES DEVAUD

*Fritz G. Herhwald*
AGENT

March 23, 1954

C. DEVAUD 2,672,730

VISCOSITY CHANGE COMPENSATION FOR HYDRAULIC FEED SYSTEMS

Filed May 28, 1951

3 Sheets-Sheet 3

INVENTOR
CHARLES DEVAUD

AGENT

Patented Mar. 23, 1954

2,672,730

UNITED STATES PATENT OFFICE 2,672,730

VISCOSITY CHANGE COMPENSATION FOR HYDRAULIC FEED SYSTEMS

Charles Devaud, Geneva, Switzerland, assignor to Chemical and Mechanical Processes Limited, Tangier, a corporation of Tangier Application May 28, 1951, Serial No. 228,577
Claims priority, application Switzerland December 22, 1950

7 Claims. (Cl. 60—52)

The object of the present invention is a hydraulic power transmission device. This name is given generally to any assembly of apparatus for securing the transmission of a motion from one place to another by means of a fluid. Although etymologically the fluid employed should be water, the hydraulic power transmission devices now in operation use preferably hydrocarbons such as lubricating oils, higher alcohols, fatty alcohols, etc., owing to their lubricating properties and their indifference to metals.

The choice of the working liquid depends on different factors such as compressibility, viscosity, nature of the joints and metals used, etc. For the sake of simplicity in this description, we will call the fluid used "oil," but it is obvious that any other liquid may be employed.

In a hydraulic power transmission device, the oil receives energy from an external source such as an electric motor which drives a pump, for instance, and transmits this energy to any working element, for instance a working piston which moves in a cylinder, a blower, a paddle motor, a turbine etc.

For the sake of clearness in the description, we use throughout the account, as working element, the example of the working piston moving in a cylinder. It is understood however that the range of the invention is not limited to this example, and that the working piston may be replaced by any machine parts whatever which can be moved by a fluid in motion.

Several factors intervene in the displacement of the working element and among them we will consider here the rate of flow and the pressure of the oil. In the case where the working element is for instance, a piston, the rate of flow governs, the speed of motion of said working piston in its cylinder according to the relation:

(I) $$W = \frac{Q}{\frac{D^2}{4}}$$

in which $W$ = velocity in cm./sec.
$Q$ = rate of flow in cm.³/sec.
$D$ = bore of the cylinder in cm.

The pressure is dependent on the force which the piston has to overcome in its motion. This pressure is determined by the relation:

(II) $$P = \frac{F}{\frac{D^2}{4}}$$

$P$ = pressure in kg./cm.²
$F$ = force to be overcome in kg.
$D$ = bore of the cylinder in cm.

It is obvious that in a hydraulic power transmission, the pressure varies with the charge on the working piston.

In many applications of hydraulic power transmission the displacement velocity of the working piston must remain as constant as possible whatever the load on the latter may be. This is mainly the case when such plant is intended to operate the tools of machine-tools.

In some known plants a volumetric pump with adjustable flow is used for controlling the working piston. In fact, the rate of flow in volumetric pumps is theoretically independent of pressure, provided the fluid used is incompressible. Now, all fluids employed in hydraulic power transmission are slightly compressible. Consequently there is a diminution of flow which is a function of the increase of pressure, which may even stop the piston, for a few moments should the load on the latter be greatly increased.

If we take into account the error due to the compressibility of the fluid in the relation between the speed of the working piston and the flow of the volumetrical pump, we find:

(III) $$W = \frac{Q}{D^2} - RVP$$

in which $W$ = piston velocity
$Q$ = rate of flow from the pump at normal pressure
$R$ = coefficient of compressibility of the oil
$V$ = oil volume under pressure
$P$ = oil pressure.

Therefore the greater the volume of oil used, the greater will be the error.

In other cases it has been found preferable to use a normal pump, a tooth wheel pump for instance, the output of which is in any case slightly higher than the flow required by the displacement of the working piston.

The excess oil delivered by the pump is then drawn out of the conduits between the pump and the working piston by means of an overflow valve.

Fig. 1 shows such an arrangement. Pump 1 delivers oil from a tank 2 to a working piston 4 moving in a cylinder 5. A safety valve 6 limits the oil pressure in the plant. The oil flow to cylinder 5 is regulated by means of cock 3.

This arrangement is not however adequate to keep constant the speed of working piston 4 whatever be the load acting upon the latter. Actually, the oil flow through cock 3 is proportional to the pressure difference at the inlet and the outlet of the cock. Now, in the pipe between pump 1 and cock 3, there is a pressure $P_1$, governed by the valve 6. This pressure $P_1$ is almost constant. On the other hand, in the piping from cock 3 to cylinder 5 prevails a pressure $P_2$ which is governed only by the load on piston 4. The pressure difference P which governs the flow through cock 3 is given by:

(IV) $$P = P_1 - P_2$$

Since $P_2$ is variable, P may also vary.

If we take into account in relation I as stated above that the flow Q is proportional to the pressure P, we see that the velocity of the working piston is influenced by the load on said piston, for a given pump pressure.

The smaller the load on the working piston, the higher will be the speed.

Figure 2:
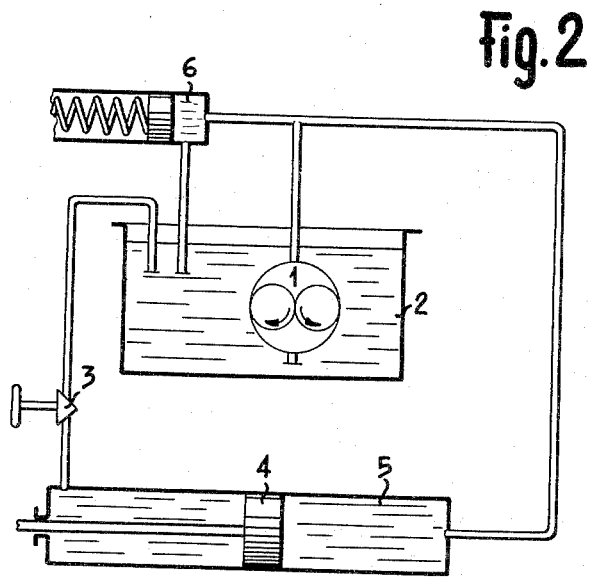

Fig. 2 shows a plant in which the working piston 4 is of the double-acting type. Furthermore, in this plant, the displacement of piston 4 in the direction of its active stroke, i. e. from right to left in the drawing, is regulated by the outflow through a throttle, cock 3 in this case, mounted on a discharge pipe, of a certain regulating volume of liquid, proportional to the displacement of working piston 4.

The pressure $P_2$ prevailing in the pipe between cylinder 5 and cock 3 is equal to:

(V) $$P_2 = F_1 - \frac{F}{S}$$

where $P_1$ is the pressure determined by valve 6
F is the load on the rod of piston 4
S is the cross-section of the cylinder or the surface of piston 4.

It is evident in this case that a variation of the load F causes again a variation of pressure $P_2$ prevailing upstream of cock 3. Pressure $P_3$ downstream of cock 3 in the piping between cock 3 and tank 2 is nil. The rate of flow through cock 3 depends therefore on pressure $P_2$.

The hydraulic power transmission device which is the object of this invention belongs to that type which includes at least one working element driven by a liquid under pressure, the displacement of this element in its active stroke being regularised by the escape through a throttle gap of a certain regulating volume of liquid proportional to the displacement of the working element.

This hydraulic power transmission device differs from the known plants in that upstream of the throttle gap, the regulating liquid works in a chamber in which a part at least of the wall may be displaced by the pressure of the regulating liquid. On the other face of the wall acts an opposing force which maintains in position a discharge valve branched on the inlet pipe conveying the liquid under pressure to the working element. It follows that if during a powered stroke of said element, the movement of the latter tends to accelerate, the resulting pressure increase of the regulating liquid provokes the lifting of the discharge valve from its seat, thus lessening the pressure of the liquid brought to the working element and re-establishes automatically the normal speed of travel of the latter.

Figure 3:
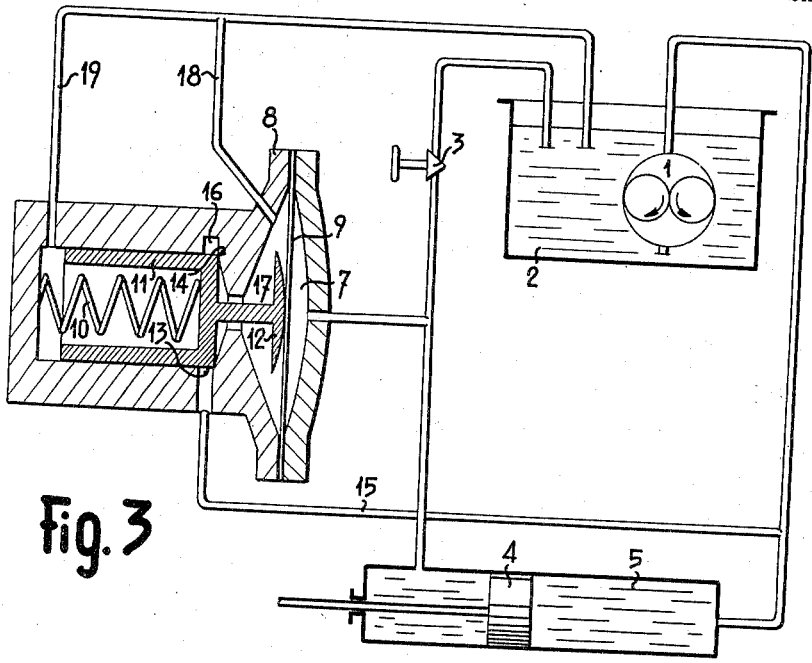
Figure 4:
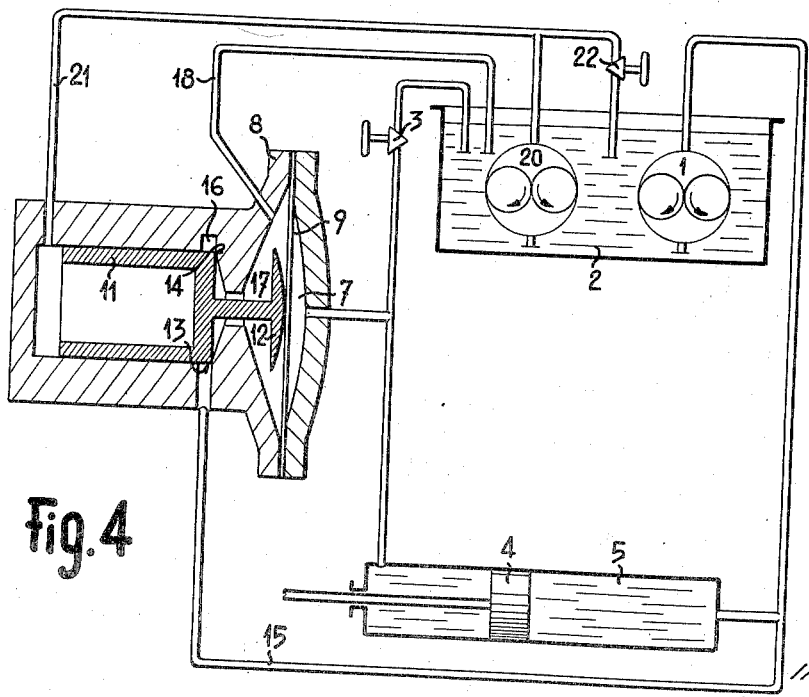
Figure 5:
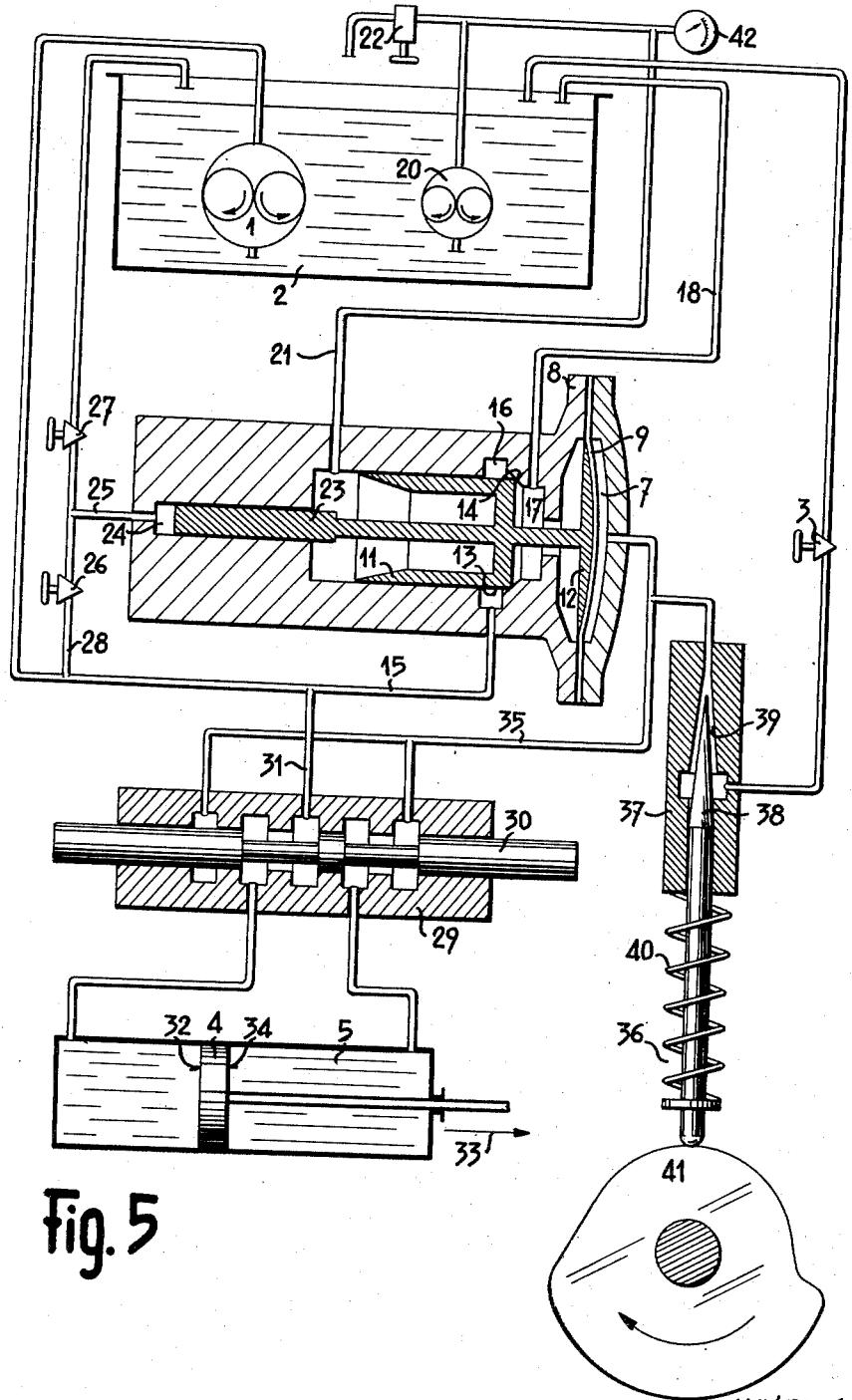

Figs. 3 to 5 of the annexed drawing show schematically and as examples, three different forms of the invention.

In the first form, shown in Fig. 3, the oil contained in a tank 2 is driven under pressure by means of pump 1 into a cylinder 5 in which travels a working piston 4 of the double-acting type. At each powered stroke of piston 4, i. e. from right to left on the drawing, a certain volume of the regulating liquid is driven out by the face of piston 4 opposite to that on which acts the liquid under pressure from pump 1.

Between the throttle gap, in this particular case cock 3, and cylinder 5, pressure $P_2$ of the regulating liquid acts in a chamber 7 in which a part at least of the wall may be displaced by said pressure $P_2$.

It must be pointed out that this pressure $P_2$ tends to reach a value given by relation IV. This chamber 7 is part of a regulating device 8 and in the type of model shown, the movable part of the wall is constituted by a deformable diaphragm 9 which may consist of a sheet of an elastic plastic substance, natural or synthetic. This diaphragm could also be made of metal. Under the effect of the pressure of the regulating liquid, the diaphragm 9 tends to move to left of the diagram, against the action of an opposing force. In this type of model the opposing force is produced by a spring 10 which acts on diaphragm 9 through the intermediary of a piston 11 possessing a mushroom-shaped extremity 12. This regulating device includes a release valve on the inlet pipe leading the liquid under pressure to the working piston 4. The working part of this release valve is formed by part 13 of piston 11 which is now held against seat 14 by spring 10. A pipe 15 allows the working liquid to fill an annular space 16 around part 13 of piston 11. A pipe 18 connects chamber 17 with the tank 2. Pipe 19 leads also to tank 2 any leakage of liquid between piston 11 and its cylinder.

In its resting position and by the action of spring 10, piston 11 presses on seat 14 so that the annular space 16 is closed on all its faces and the oil coming from pump 1 cannot escape in any way. If by the effect of the pressure exerted on diaphragm 9, the piston 11 is displaced away from its seat 14, a portion of the oil coming from pump 1 flows through chamber 17 and pipe 18 towards tank 2. Thus a condition of pressure stabilization is attained on the powered face of piston 4 so that the pressure exerted on its opposite face will allow the opening of the release valve, by moving away part 13 of piston 11 from its seat 14. An equilibrium is thus established between the thrusts of spring 10 and those of the oil on diaphragm 9. The thrust of the spring being practically constant, the oil pressure on the diaphragm and through it on the face of piston 4 upon which acts the regulating liquid, i. e. $P_2$, is also practically constant. The rate of flow through cock 3 will thus be practically constant, and hence the speed of displacement of piston 4 will be likewise constant.

In other words, every time that the piston 4 tends to accelerate in its powered stroke, the resulting rise of pressure for the regulating liquid between piston 4 and throttle gap 3 provokes the lifting of outlet valve 13 from its seat 14, letting out a certain volume of working liquid which flows to tank 2 through pipe 15, the annular space 16, chamber 17 and pipe 18.

This outflow of the working liquid causes therefore a loss of pressure of the liquid delivered to the working piston 4 and re-establishes automatically the normal speed of travel of the latter.

Since all these corrective operations are carried out in minimum time, the speed of displacement of the working piston 4 is maintained at a practically constant value.

The regulating device 8, described above, thus works so as to maintain constant the pressure $P_2$ prevailing in chamber 7. In fact, it follows from the relation IV that if the condition:

$$P_2 = \text{constant}$$

be fulfilled, although force F varies, and although $P_3$ be nil (pressure in the pipe downstream from cock 3), the rate of flow from cock 3 remains constant and the speed of displacement of the piston 4 in cylinder 5 remains likewise constant.

Fig. 4 represents diagrammatically a second form of the invention, differing from the first in the fact that the spring 10 of Fig. 3 has been suppressed, and replaced by the action on piston 11 of the pressure of the oil supplied by a second pump 20, by means of pipe 21. A throttle gap, in the present case a cock 22, allows the pressure of oil on piston 11 to be controlled at will. This device has the advantage over the preceding one in allowing a thrust on membrane 9, independent of the position of the piston 11.

Moreover, this device allows an automatic compensation for variations in viscosity of the oil. In fact, the viscosity of the oil varies with its temperature. Since viscosity plays a part in the speed of flow through the throttle gap 3, the output is only constant as long as the viscosity remains constant. For example, if as a result of increase in the temperature of the oil, arising from the working of the pumps, the viscosity diminishes, the output of cock 3 increases for any given pressure and cross-section of aperture. But in this case, and for the same reason, the output from valve 22, whose oil comes from the same tank 2 increases in the same proportion and the counter-pressure exerted on piston 11 by the oil from pump 20 diminishes. There follows a proportional diminution of the pressure on diaphragm 9, to obtain equilibrium with the counter-pressure acting on piston 11. Hence there follows a proportional diminution in the output of cock 3, thus re-establishing the initial conditions.

Fig. 5 represents in outline a third form of the invention whose working is in every way similar to that described with reference to Fig. 4, but whose regulator device comprises a cylinder 24 enclosing a second piston 23 immovably joined to piston 11. This cylinder 24 is for the purpose of correcting the retarding effects due to throttling of the oil between piston 11 and seat 14.

Pump 1 feeds on one hand piston 4, and on the other piston 23. The output pressure of pump 1, when the discharge valve 13 is closed, is determined by two chokes 26 and 27, arranged in series in discharge pipe 28. A pipe 25 leading from a point situated between the two chokes 26 and 27, each of which consists of a throttle cock, supplies cylinder 24. Thus, when the effort on piston 4 increases, the pressure of oil on the powered surface of the piston 4 should increase; this entails an increase in pressure in the ring shaped space 16. Part 13 of piston 11 should then, under the influence of diaphragm 9 and the counter-pressure of the oil, move back towards its seat 14, which has the effect of accelerating the speed of the oil between seat 14 and piston 11. This acceleration tends to push piston 11 away from seat 14; but piston 23 then comes into action, receiving by pipe 25 liquid under a pressure proportional to that acting on the powered surface of the piston 4. Piston 23 then tends to move piston 11 nearer its seat 14. The value of this correction can be controlled by the adjustment of the cocks 26 and 27.

In this latter form, the working piston 4 is fed with working liquid by means of a distributor unit 29 which allows the liquid to be sent to either the one or the other of the two faces of the piston 4. In the present case this distributor unit 29 is of the slide-valve type 30 which may be operated automatically by the machine on which the installation is mounted, or by hand. In the position represented by Fig. 5, the slide valve 30 allows the working liquid arriving by supply pipe 31 to exert its pressure on surface 32 of piston 4. Hence the latter moves in the direction of arrow 33 and the liquid pushed back by surface 34 of piston 4 escapes through the discharge pipe 35. When the slide valve 30 is pushed towards the left-hand side of Fig. 5, the working liquid acts on the face 34 of the piston 4, and this latter moves in the direction opposite to that shown by the arrow 33.

Unit 36 is intended to produce immobilization of the piston 4. This unit comprises a plug valve 37 inserted in discharge pipe 35. The plug 38 of this valve is held off its seat 39 by a spring 40. A cam 41 controlled by the machine on which the installation is mounted, determines the timing of the opening and closing of this valve 37. Thus, each time valve 37 is closed, the discharge pipe 35 being blocked, the piston 4 remains motionless. The increase in liquid pressure in pipe 35 resulting from closure of valve 37 produces movement of piston 13 away from its seat 14, and thus the working liquid supplied by pump 1 is able to escape towards tank 2 by pipe 18. A manometer 42 affixed to pipe 21 allows a check to be kept in the output pressure of pump 20.

In the three forms of hydraulic control device described with reference to Figs. 3 to 5, the movable part of the wall is formed by a diaphragm 9. However, it is obvious that this diaphragm 9 could be replaced by a piston whose face would bound chamber 7 on one side, while the opposite face would form a wall of chamber 17. A leakage of liquid between this piston and its cylinder could be corrected for by the choice of a given section of the throttle gap 3, subject always to the condition that the total flow of liquid through the discharge pipe 35, the flow which determines a minimum and constant speed of travel of the working piston 4, should not be less than that of the said leakage.

As a variation of the above, instead of comprising only a single piston 4, with double action, the device could include several pistons; moreover, this or these double-action pistons could be replaced by single action pistons whose rod controls the stroke of a single action piston working in a cylinder other than cylinder 5. Thus the regulator liquid itself could be different from the working liquid acting on the powered surface of piston 4. For this, the installation should include two tanks 2, one feeding the pump 1, and the other, the pump 20 together with the cylinder receiving the regulator liquid.

The above remark is valid not only for the case where the working agent is a piston, but also for the case where the working agent is constituted by any working part whatever that can be moved by a moving fluid.

It is to be noticed, moreover, that in all these different models which are intended especially for application to machine-tools, an appliance could be designed to produce maximum opening of cock 3 when the piston 4 is on its return stroke to its initial position, so that this stroke is made in minimum time.

To make the drawing easier to understand, the units needed to produce the return stroke of piston 4 in the models represented by Figs. 3 and 4, have not been shown. These units can be of the same kind as that shown in Fig. 5, or again include any arrangements of pipes, valves, cocks, etc., already used in known devices, provided that in this case it is not necessary that the speed of movement of piston 4 in the negative direction be constant.

I claim:

1. In a hydraulic power transmission device of the type including at least one working part to be moved by a liquid under pressure, the movement of this part in the direction of its powered stroke being regulated by the escape through a throttle gap of a certain volume of regulator liquid, proportional to the displacement of the working part, wherein the regulator liquid acts in a chamber of which at least a part of one wall can be displaced by the action of the pressure of the regulator liquid, and against the action of a counter force holding in position a discharge valve of the inlet pipe bringing liquid under pressure to the working part, so that each time, in the powered stroke of the said working part, its movement tends to accelerate, the increase in pressure in the regulator liquid results in the valve being forced from its seat, which reduces the pressure of the liquid supplied to the working part, and automatically re-establishes the normal speed of displacement of the latter, and wherein said counter force is produced by a liquid under pressure acting on a piston, to which said discharge valve is immovably fixed, the improvement which comprises a common reservoir for the regulator liquid, the liquid acting on said discharge valve and the liquid actuating said working part, so that any variation in viscosity due to a change of temperature of the liquid produces equal pressure variations on both sides of said displaceable wall and the discharge valve remains unaffected by temperature changes of the liquid; two pumps, one of said pumps continuously drawing liquid from said common reservoir to operate said working part, the second of said pumps continuously drawing liquid from said common reservoir to produce said counter force; a feed line for the liquid delivered by said second pump; and a throttle gap in said feed line to adjust the pressure acting on said discharge valve.

2. Device according to claim 1, the special characteristic of which is that the discharge valve is immovably fixed to a second piston, on which acts a liquid under a pressure proportional to that of the liquid which drives the working part.

3. Device according to claim 2, the special characteristic of which is that a common source of liquid under pressure feeds the working part and the second piston of the discharge valve, two chokes arranged in series on the discharge pipe of the said source determining the pressure of the liquid supplied thereby, the second piston of the discharge valve being fed with liquid at a point situated between the two chokes.

4. Device according to claim 3, the special characteristic of which is that the throttle gaps and the chokes are of adjustable cross-section and consist of throttle cocks.

5. Device according to claim 1, the special characteristic of which is that the surface of the displaceable wall opposite to that on which the regulator liquid acts forms part of the internal wall of the discharge channel which is controlled by the said valve, so that when this opens, the liquid under pressure which it controls, and which comes from the source which feeds the working element acts on the said surface.

6. Device according to claim 1, the special characteristic of which is that the movable wall consists of a diaphragm.

7. Device according to claim 1, the special characteristic of which is that the movable wall consists of a piston.

CHARLES DEVAUD.

References Cited in the file of this patent

UNITED STATES PATENTS

| Number | Name | Date |
|---|---|---|
| 1,970,181 | Monroe | Aug. 14, 1934 |
| 2,028,766 | Ernst et al. | Jan. 28, 1936 |